United States Patent [19]

Williams

[11] 3,886,351

[45] May 27, 1975

[54] OPTICAL-TO-ELECTRONIC INTERFACE CIRCUIT

[75] Inventor: Donald N. Williams, San Diego, Calif.

[73] Assignee: The United States of America as represented by the Secretary of the Navy, Washington, D.C.

[22] Filed: Mar. 11, 1974

[21] Appl. No.: 449,814

[52] U.S. Cl. .............................. 250/206; 250/214 R
[51] Int. Cl. .............................................. H01j 39/12
[58] Field of Search ........... 250/551, 206, 214, 199; 307/311; 350/96 WG

[56] References Cited

UNITED STATES PATENTS

| | | | |
|---|---|---|---|
| 3,622,801 | 11/1971 | Stone | 307/311 |
| 3,772,514 | 11/1973 | Sunderland | 250/551 |
| 3,813,540 | 5/1974 | Albrecht | 250/206 |

*Primary Examiner*—Eli Lieberman
*Assistant Examiner*—D. C. Nelms
*Attorney, Agent, or Firm*—R. S. Sciascia; G. J. Rubens; J. W. McLaren

[57] ABSTRACT

An optical-to-electronic interface circuit is provided for converting digital signal information in the form of light energy into commensurate digital electronic signals. A photoresponsive means is positioned to receive light signals for developing commensurate electrical signals. A first differential amplifier is connected to receive the electrical output signals as a first input and also a known fixed reference as a second input for generating first and second output signals having a differential therebetween as a function of the differential between its received inputs. First and second unidirectional current paths connect the first and second output signals of the first differential amplifier as inputs to a second differential amplifier. A differential comparator receives the output signals developed by the second differential amplifier for generating a signal as a function of the difference between its received signals.

7 Claims, 1 Drawing Figure

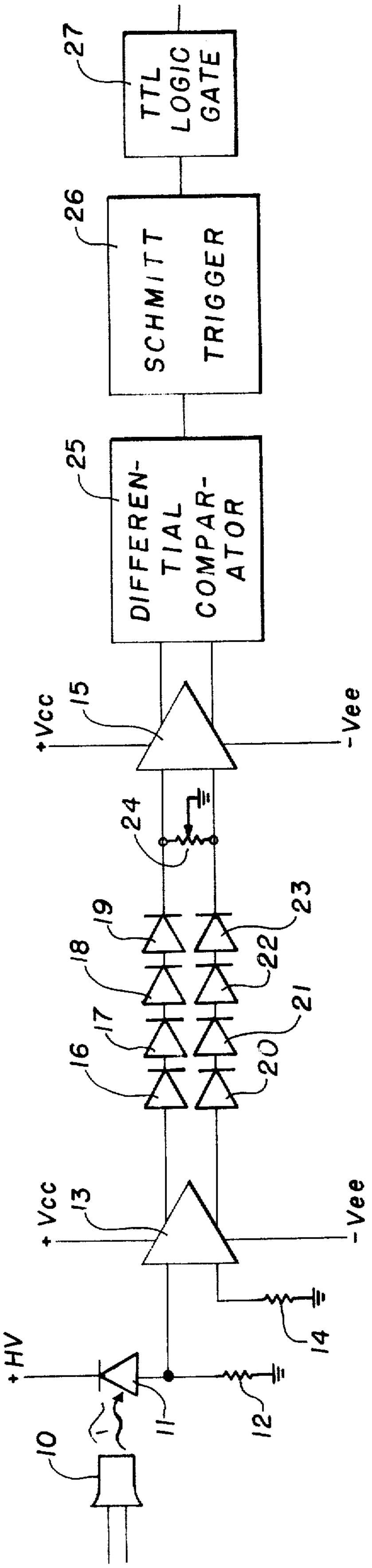
TTL LOGIC GATE
SCHMITT TRIGGER
DIFFEREN-TIAL COMPAR-ATOR
+Vcc
-Vee
+HV
10
11
12
13
14
15
16
17
18
19
20
21
22
23
24
25
26
27

OPTICAL-TO-ELECTRONIC INTERFACE CIRCUIT

BACKGROUND OF THE INVENTION

Electro-optical systems frequently transmit digital information in the form of light energy. When such light signals are intended to be used in connection with electronic data processing or computation equipment, it is necessary to convert the signal information contained in the light energy into an appropriate electronic form which is compatible with electronic digital logic levels. Thus, an optical-to-electronic interface is required to accomodate the use and processing of the signal information contained in received light energy. Such light signals may typically be transmitted over a fiber optic signal transmission line and subsequently converted to suitable electronic digital logic levels to facilitate their use in electronic data processing and computation equipment.

Prior art methods frequently employed photomultiplier components to receive the light energy and convert it into appropriate electronic digital signals. However, such photomultipliers suffer from disadvantages including the fact that they are relatively large units, require high voltage supplies, and generally are not suited to high data rates. Other prior art techniques employed trans-impedance amplifiers (a form of operational amplifier) with photo diodes. However, these latter techniques unfortunately suffered from relatively limited bandwidth characteristics and, moreover, were relatively quite expensive as compared with other prior art circuits which were substantially functionally equivalent.

Accordingly, there is a need for an optical-to-electronic interface circuit for converting signal information contained in light energy into electronic signals having logic levels appropriate to use in electronic data processing and computation equipments.

SUMMARY OF THE INVENTION

The optical-to-electronic interface circuit of the present invention comprises a photo-responsive means positioned to receive light signals for developing electrical output signals as a function of the received light energy. A first differential amplifier is connected to receive the electrical output signals as a first input and also a known fixed reference as a second input. The first differential amplifier generates first and second output signals having a differential therebetween as a function of the differential between its received inputs. First and second unidirectional current paths connect the first and second output signals of the first differential amplifier as inputs to a second differential amplifier.

The outputs of the second differential amplifier are connected to a differential comparator which then generates a signal as a function of the instantaneous difference between the output signals developed by the second differential amplifier.

In its preferred form, the photo-responsive means may comprise a photo-diode back-biased in the photo conductive mode and positioned to receive the incoming signals in the form of light energy. The light energy impinging upon the diode will cause a signal current in an appropriately connected resistor and the signal thus developed may be amplified by two direct-coupled differential amplifiers which may typically take the form of commercially available video amplifiers in integrated circuitry configurations.

The direct coupling between the differential amplifiers is accomplished by two separate unidirectional current paths, each of which may comprise a number of series-connected, forward-biased, diodes. A differential comparator receives the outputs of the second differential amplifier, further amplifies the video signal, shapes it, and converts it to appropriate logic levels. The comparator also advantageously provides high common mode rejection. Each of the latter-named circuits is also commercially available in several integrated circuitry forms.

The new circuit concept offers the advantages of being considerably smaller, substantially more temperature stable, and affording greater bandwidth than prior art circuit. These desirable features are provided by the use of wide band differential amplifiers, the direct coupling of all stages, and also the advantageous optional use of a line receiver as the differential comparator.

The concept of the present invention also affords optional variable gain by suitable connections and/or the addition of resistive elements with appropriate connections in the circuits. Moreover, the component circuits employed in implementing the concept of the present invention are available in several variations of integrated circuit chip form and may be fabricated into a hybrid package.

Accordingly, it is a primary object of the present invention to provide an optical-to-electronic interface circuit which obviates many of the disadvantages of functionally comparable prior art circuits.

Another most important object of the present invention is to provide such a circuit having desirably broad bandwidth operation, high common mode rejection, and wide temperature range operation.

Yet another object of the present invention is to provide such an optical-to-electronic interface circuit which is adaptable to offer selectable gain, bandwidth, bandpass, and output logic compatibility.

Another most important object of the present invention is to provide such an optical-to-electronic interface circuit which is adaptable to provide output signals in linear or digital format.

These and other features, objects, and advantages of the present invention will be better appreciated from an understanding of the operative principles of a preferred embodiment as described hereinafter and as illustrated in the accompanying drawings.

BRIEF DESCRIPTION OF THE DRAWING

The DRAWING is a schematic wiring diagram illustrating a preferred embodiment of the present invention.

DESCRIPTION OF THE PREFERRED EMBODIMENT

In the drawing, a source of light signals is illustrated as the terminal 10 of a fiber optic line such as typically may be employed in fiber optic communication systems. The light signals emitted from the fiber optic terminal 10 are directed to a photo diode 11 shown as being connected to a suitable high voltage source. The photo diode 11 is also connected to ground through a resistive element 12; thus, the photo diode 11 operates to develop an electrical signal across the resistive element 12 commensurate with the light signals it receives from the fiber optic terminal 10.

The electrical signals develop across the resistive element 12 are connected as a first input to a first differential amplifier 13. A resistive element 14 connected between the second input terminal of the first differential amplifier 13 and ground potential provides a known fixed reference signal as a second input to the first differential amplifier 13. The first differential amplifier 13 operates to generate first and second output signals having a differential therebetween as a function of the differential between received inputs.

The first output signal of the first differential amplifier 13 is connected through a unidirectional current path to provide the first input to a second differential amplifier 15. The first unidirectional current path comprises a plurality of forward-biased diodes 16, 17, 18, and 19, series connected between the first output of the first differential amplifier 13 and the first input to the second differential amplifier 15. In a similar manner, the second output of the first differential amplifier 13 is connected by a unidirectional current path to provide the second input to the second differential amplifier 15. The second unidirectional current path comprises a like plurality of forward-biased diodes 20, 21, 22, 23 connected between the second output of the first differential amplifier 13 and the second input to the second differential amplifier 15.

A potentiometer 24 having its tap connected to ground is connected across the inputs of the second differential amplifier 15 to provide selectively variable correction of the dc balance input to the second differential amplifier 15. The second differential amplifier 15 provides first and second outputs as a function of the differential between its received input signals and such output signals are connected as the inputs to a differential comparator 25.

The differential comparator 25 operates to generate a signal as a function of the difference between the output signals developed by the second differential amplifier 15. The output of the differential comparator 25 may in some instances be used directly as the final output signal of the optical-to-electronic interface circuit of the present invention. However, in other applications further modification of the signal may be necessary or desirable. Accordingly, the output of the differential comparator 25 may be connected to a Schmitt trigger circuit 26 and its output in turn connected to a TTL logic gate 27, the output of the logic gate 27 being employed as the digital input to data processing or computation equipment, for example.

It will be appreciated by those skilled in the art that the first differential amplifier 13 and the second differential amplifier 15 may be chosen as one of several types of differential amplifiers, a typical example of which would be the 733 wideband, video type of differential amplifier which is commercially available in variant integrated circuit forms from a number of different manufacturers.

The output of the first differential amplifier 13 is at a different dc potential than the input of the second differential amplifier 15 and therefore some dc restoration or dc level change is required to match the output of the first differential amplifier 13 to the input of the second differential amplifier 15 which may typically be of the same type as previously noted. In prior art practices related to the use of differential amplifiers, it had been a conventional technique to employ passive, resistive divider neworks to achieve the desired dc restoration or dc level changing. However, the use of such passive, resistive divider networks resulted in undesirable signal attenuation.

In accordance with the present concept, the first differential amplifier 13 is connected to the second differential amplifier 15 by direct coupling as provided through first and second unidirectional current paths. These paths may be provided by a plurality of forward-biased, series-connected diodes as illustrated in the drawing. Each combination of series-connected, forward-biased diodes performs essentially the same operative effect as the use of a low-voltage zener diode and provides significantly reduced signal attenuation in connecting an output signal of the first differential amplifier 13 as an input signal to the second differential amplifier 15. The plurality of forward-biased diodes, it has been found, more closely meet the voltage considerations in many practical applications as compared with zener diodes and, moreover, the temperature coefficient considerations can usually be more readily dealt with in the use of the plurality of forward-biased as contrasted to zener diodes.

The concept of the present invention may be desirably accommodated by commercially available, multiple, series-connected diodes in the form of a single unit with specified forward voltages and temperature coefficients. Thus, the first unidirectional current path including series-connected diodes 16, 17, 18, and 19 and the second unidirectional current path including series connected diodes 20, 21, 22, and 23, may take the form of identical, unitary packaged commercially available components.

The first and second unidirectional current paths provided by commercially available units will develop approximately two and one-half to three volts drop from the output of the first differential amplifier 13 to the input bias level of the second differential amplifier 15. Those knowledgable and skilled in the pertinent arts will appreciate the advantage of employing identical commercially available units inasmuch as they may be selected for matching temperature coefficients and forward voltages to better accommodate the amplifier quiescent levels.

The potentiometer 24 which is connected across the inputs of the second differential amplifier 15 is used to correct for any undesirable dc offset. The differential amplifier 13 is usually set at its maximum gain for the bandwidth desired and the second differential amplifier 15 is customarily operative at a somewhat lower gain to maintain stability in the two amplifier configuration. The overall gain is determined as a function of the output signal levels that are required by associated circuitry.

In certain applications there are several options which may be availed of to convert the second differential amplifier 15 outputs to the final output of the signal format. In the schematic drawing the final circuit combination is shown as having three separate and distinct functions, namely, the differential comparator 25, the Schmitt trigger circuit 26, and the logic output gate 27. In the practice of the present invention this combination, which may be found in a single commercially available unit of integrated circuitry such as the 75107 line receiver, may be employed or fewer functions may be used in other configurations to meet variant requirements.

For example, where they are linear output signal requirements, the outputs of the second differential amplifier 15 would be used directly or with the differential output converted to a single-ended output. Where the interface is for digital signal purposes, only the differential comparator or the differential comparator in combination with the logic output gate need be used. The particular circuit combination selected and the type of comparator used is determined by the bandwidth and gain requirements together with the logic compatibility output requisites and considerations.

One of the most highly desirable and unique features of the present invention is the differential operation from the signal sensing point at the photo diode through to the conversion to a logic or linear format in the final output circuits. This differential operation throughout the amplification stages, preferably using integrated circuits, provides a very low temperature drift and a very high common mode rejection. For good temperature immunity the biasing/coupling diodes which provide the first and second unidirectional current paths between the first and second differential amplifier are temperature coefficient matched and packaged together assuring tracking temperature operation.

The first and second differential amplifiers 13 and 15 may typically be identical unitary integrated circuits having a potential bandwidth in excess of 100Mhz. Without modifying the first differential amplifier 13 or the second differential amplifier 15 or their biasing, the bandwidth of the photo detector system may be reduced by increasing the resistive values of resistors 12 and 14. The increase of the resistive value of the resistor 12, which is the sensing load for the photo diode 11 in combination with the capacitance of the photo diode 11, will provide a roll-off producing bandwidth limitations at the front end of the amplification stages. Conventional techniques may be employed in limiting the amplifier bandwidths in the interstage networks by adding passive components.

An additional desirable feature of the amplifier combination as employed in the present concept is the fact that it does have dc operation from the photo signal through to the final output signal. This provides a dc signal capability which is available to accommodate the particular requisites of different output signal formats. For example, signals with extensive duty cycle variations or signals with dc components could not ordinarily be properly processed in ac coupled amplifiers; however, the concept of the present invention overcomes this difficulty by providing a desirable dc signal capability.

Those skilled and knowledgable in the pertinent arts will readily appreciate that the concept of the present invention may be implemented in a variety of configurations to provide optical signal detection and optical-to-electronic interface to satisfy many different requirements. Some of the principal features and desirable advantages of the present invention are:

a. dc-100 Mhz bandwidth capability
b. Selectable gain
c. Selectable bandwidth, bandpass
d. Selectable linear or digital output format
e. Selectable output logic compatibility
f. High common mode rejection
g. Wide temperature operation
h. Hybrid fabrication Additionally, as has been previously noted, many of the principal components employed in accordance with the concept of the present invention may be in the form of unitary integrated circuit elements which are presently commercially available, thus simplifying the implementation and practice of the present invention, as well as providing highly desirable performance.

Obviously many modifications and variations of the present invention are possible in the light of the above teachings. It is therefore to be understood that within the scope of the appended claims the invention may be practiced otherwise than as specifically described.

What is claimed is:

1. An optical-to-electronic interface circuit comprising:

a photo-responsive means positioned to receive light signals for developing electrical output signals as a function of said light signals;

a first differential amplifier connected to receive said electrical output signals as a first input, and a known fixed reference as a second input for generating first and second output signals having a differential therebetween as a function of the differential between its received inputs;

a second differential amplifier;

first and second unidirectional current paths connecting said first and second output signals as inputs to said second differential amplifier; and a differential comparator connected to receive the output signals of said second differential amplifier for generating a signal as a function of the difference between said output signals developed by second differential amplifier.

2. An optical-to-electronic interface circuit as claimed in claim 1 wherein said first and second unidirectional current paths each comprises a plurality of series-connected, forward-biased diodes.

3. An optical-to-electronic interface circuit as claimed in claim 2 wherein said diodes are matched for substantially equivalent temperature coefficients and forward voltages.

4. An optical-to-electronic interface circuit as claimed in claim 1 wherein the output signals of said differential comparator are connected to a signal shaping circuit and a digital logic gate.

5. An optical-to-electronic interface circuit as claimed in claim 1 and including a potentiometer connected between said first and second unidirectional current paths with its variable tap connected to ground potential for selectively adjusting the balance between said paths.

6. An optical-to-electronic interface circuit as claimed in claim 1 wherein said differential comparator is included as part of a differential line receiver.

7. An optical-to-electronic interface circuit as claimed in claim 1 wherein said first and second differential amplifiers are identical.

* * * * *